United States Patent
Kieft et al.

(10) Patent No.: US 8,965,349 B2
(45) Date of Patent: Feb. 24, 2015

(54) INTERACTIVE APPLICATION SHARING

(75) Inventors: Brandon Joseph Kieft, Essex Junction, VT (US); Catherine Rose Grevet, Atlanta, GA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 13/359,185

(22) Filed: Jan. 26, 2012

(65) Prior Publication Data

US 2013/0194374 A1 Aug. 1, 2013

(51) Int. Cl.
*H04M 3/42* (2006.01)
*G06F 3/00* (2006.01)

(52) U.S. Cl.
USPC .................................. 455/414.2; 715/753

(58) Field of Classification Search
USPC .................. 379/202.01; 709/204–205, 217; 345/173; 455/414.2
See application file for complete search history.

(56) References Cited

U.S. PATENT DOCUMENTS

| | | | |
|---|---|---|---|
| 6,038,593 A * | 3/2000 | Huckins | 709/217 |
| 2003/0167418 A1 * | 9/2003 | Zhu et al. | 714/4 |
| 2003/0208541 A1 * | 11/2003 | Musa | 709/205 |
| 2004/0208303 A1 * | 10/2004 | Rajagopalan et al. | 379/202.01 |
| 2006/0248144 A1 * | 11/2006 | Zhu et al. | 709/205 |
| 2009/0247136 A1 * | 10/2009 | Srinivasan et al. | 455/414.2 |
| 2012/0092277 A1 * | 4/2012 | Momchilov | 345/173 |
| 2012/0163577 A1 * | 6/2012 | Buford et al. | 379/202.01 |
| 2012/0278388 A1 * | 11/2012 | Kleinbart et al. | 709/204 |
| 2012/0317295 A1 * | 12/2012 | Baird et al. | 709/228 |
| 2012/0331406 A1 * | 12/2012 | Baird et al. | 715/760 |

* cited by examiner

*Primary Examiner* — Mohammad Islam
(74) *Attorney, Agent, or Firm* — Schwegman Lundberg & Woessner, P.A.

(57) ABSTRACT

Embodiments permit interactive sharing of applications. Multiple electronic devices may share applications, or application data, in such a fashion that users of the electronic devices may each see one another's application data or interact with one another through a shared application. In some embodiments, users may control what data is shared by designating certain data as public or private. In other embodiments, interactive sharing of applications may be combined with, or incorporated into, a communication between users, such as a video conference.

22 Claims, 9 Drawing Sheets

ND SHARING

TECHNICAL FIELD

Embodiments described herein generally relate to sharing interactive applications, and more particularly to real-time sharing of interactive applications.

BACKGROUND

The explosion of computing has profoundly affected the lives of nearly every person. Computers have become ever more common, inexpensive and small. Today, many people carry portable computing devices—mobile phones, tablet computers, personal digital assistants, and the like—that are far more powerful and versatile than most computers were twenty years ago.

This portability and pervasiveness has led to shifts in the way we accumulate, experience and share information. On average, people are today far more accessible and in touch than in years past. In many cases, this high degree of connectedness between people is now expected.

As part of forming connections with others, people naturally share information about themselves, their interests, their activities, and so on. Information sharing has, in many ways, become a primary means to staying in touch with friends, family and colleagues, as well as forming bonds with new people.

Information sharing is also very common in businesses. Employees often need to share information with one another or their organization to ensure continued business success. More efficient sharing can create a competitive advantage in the marketplace.

Portable computing devices facilitate this type of information sharing but are not perfect. Many times, information must be transformed before it can be shared. For example, drafts of documents might be emailed from one worker to another rather than shared directly in the context of a commonly-used application. Barriers to information sharing cause added complexity, cost time and disconnect people from one another.

Thus, what is needed is an improved way to interactively share applications and their data.

SUMMARY

Embodiments discussed herein may permit multiple electronic devices to interactively share applications. Applications may be accessed by multiple users from multiple different electronic devices, all remotely. In this manner, multiple users may collaborate and share information effectively and without requiring all to be physically present.

One electronic device may act as the host for the application. Other devices may transmit application data and/or user input to the host. The host device may process this data, update the application and instruct the remote electronic devices how to display the shared application. The instruction may be a screen image of the application or may be data used by a remote device to update the application on an associated display screen. In some embodiments, the instruction may inform a device of an orientation for the application, application data or overall device display.

Users may designate certain application data to be private, thereby affecting the way in which it is shared (or not shared) with other users through the interactive application. Private data may not be shared at all, or may be shared in such a fashion that particular information is obscured, left out or otherwise restricted.

In some embodiments, application sharing may take place in the context of a telephone or video communication. Each device may participate in application sharing within the communication, and each device may simultaneously display both the communication and shared application.

One embodiment described herein takes the form of a method for interactively sharing an application, including the operations of: initiating a communication between a first and second electronic device; after initiating the communication, transmitting a request, from the first electronic device to the second electronic device, to engage in sharing an application; receiving, at the first electronic device, confirmation of sharing from the second electronic device; displaying, on the first electronic device, the application and data related to the communication; generating, at the first electronic device, an instruction to the second electronic device, the instruction related to displaying the application on the second electronic device; and transmitting the instruction to the second electronic device.

DETAILED DESCRIPTION

I. General Overview

Generally, embodiments discussed herein facilitate interactive sharing of applications. That is, embodiments permit multiple electronic devices to share applications, or application data, in such a fashion that users of the electronic devices may each see one another's application data or interact with one another through a shared application. In some embodiments, users may control what data is shared by designating certain data not to be shared (e.g., private). In other embodiments, interactive sharing of applications may be combined with, or incorporated into, a communication between users, such as a video conference. Application data may be overlaid on the image from the video conference or vice versa. In still other embodiments, application sharing may be accomplished by permitting each user to control certain application functionality, locking out any other users from controlling the same functionality.

It should be appreciated that certain embodiments may combine any or all of the functions described herein. As one example, an embodiment may permit application sharing and application data sharing, permit users to designate private data, incorporate sharing into a video conference (optionally by overlaying one on the other) and permitting application functionality to be locked out as described above. In some embodiments, application developers, system administrators, device manufacturers and/or other third parties may designate data as private.

Generally, a reference to interactively sharing an application should be understood to encompass sharing data for an application, in addition to or instead of sharing the application itself. The reverse is also true.

II. Sample Electronic Device

Figure 1:
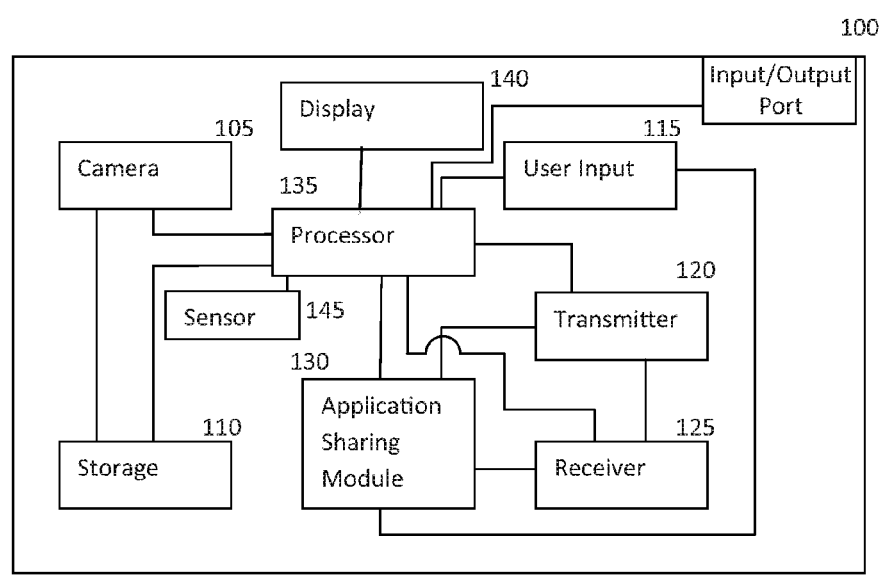
FIG. 1 is a block diagram of a sample electronic device used for sharing an interactive application with another electronic device.

FIG. 1 is a block diagram of a sample electronic device 100 that may be used to interactively share applications. The electronic device may be a portable device, such as a smart phone, tablet computing device, laptop computer, digital camera, digital telephone handset or the like. Alternately, the electronic device may be a relatively stationary device, such as a desktop computer, digital telephone base, television, media center and so on. With respect to FIG. 1, it should be appreciated that lines connecting various elements of the device represent communication paths between such elements. These paths may be bidirectional or omnidirectional, as technically appropriate and depending on the embodiment.

Typically, the electronic device 100 includes a processor 135. The processor generally controls operations of the electronic device 100 and may interact with the various other components of the device. The processor may execute software, retrieve data stored on a storage device 110, receive input from a user input mechanism 115, receive data from a receiver 125, control data transmission through a transmitter 120, and the like. The processor 135 may be any suitable digital processing unit, such as the A4 chip, the A5 chip, an INTEL-based processor (e.g., an i7 processor, i9 processor, ATOM processor and the like), and so on. The processor may be single core or multi-core. Further, it should be appreciated that multiple processors may be used although only one is shown in FIG. 1. As one example, a dedicated graphics processing unit may be employed in addition to the processor 135.

The electronic device 100 generally includes a camera 105 or other image capture device. The camera may permit a user of the device to engage in video conferencing with another person, such as a user of a second electronic device (not shown). The operation of the camera may be controlled by the processor 135, optionally in response to user input received through a user input interface 115 and processed by the processor.

Typically, the electronic device 100 also includes a storage medium 110. The storage medium may store digital data, including images captured by the camera 105, applications for execution on the device, an operating system, application data, and the like.

The user input 115 generally receives input from a user, thereby permitting him or her to interact with the electronic device 100. The user input may take a variety of forms. Many modern smart phones and tablet computing devices employ a touch screen to accept user input, for example. The touch screen could be capacitive, resistive, or based on interference with electromagnetic wavelengths (such as a finger breaking a UV light beam transmitted across the top surface of a display screen 140). Other embodiments may employ a presence or gesture detector, such as a reflected beam of non-visible light, as a user input 115. Still other embodiments may employ a peripheral as a user input 115, including a touchpad, keyboard, mouse, stylus and the like. The user input generally allows a user to manipulate certain functions of the electronic device 100, including interacting with and sharing applications resident on the device's storage and executed by the processor 135. The user input 115 may be either wired or wirelessly connected to the device. For instance, user input 115 may take the form of an accessory input device in communication with the device and transmitting/receiving human interface device commands.

One or more sensors 125 may be incorporated into the device 100. The sensor(s) 145 may communicate data to the processor 135 as shown in FIG. 1; in some embodiments, the sensor may communicate data to the application sharing module 130 in addition to, or instead of, the processor. Such data may further be relayed between electronic devices during interactive application sharing, and may influence a display, user interface, or other output associated with the interactive application sharing. Sample sensors include, but are not limited to, ambient light sensors, gyroscopic sensors, accelerometers, temperature sensors, microphones, imaging devices, and the like. Further, an input/output port 150 may be included to permit transmission of data to and from the electronic device 100.

The device's transmitter 120 may transmit data from the device 100, across a network, to a remote device, a server, a service provider and the like. The exact nature of the transmitter 120 may vary depending on the network with which the transmitter interacts. The transmitter may be a wireless transmitter or it may be a jack or port by which a wired connection is made.

The receiver 125 essentially is the converse of the transmitter 120. The receiver 125 receives data transmitted across a network or any other device. The receiver 125 and transmitter 120 may be combined into a single transceiver.

The application sharing module 130 generally controls the aspects of, and interactions associated with, interactive application sharing. This module may be software or other code that is stored on the storage medium 110 and executed by the processor 135 whenever applications are shared or sharing is initiated. Alternately, the application sharing module 130 may be firmware, hardware, or software or any combination thereof dedicated to handling the various operations (or some of the operations) that occur while sharing applications. In some embodiments, the application sharing module 130 may be hosted on a server or other remote device and accessed by the devices engaged in application sharing. The application sharing module may be omitted in certain embodiments and its duties performed by the processor 135.

Figure 2:
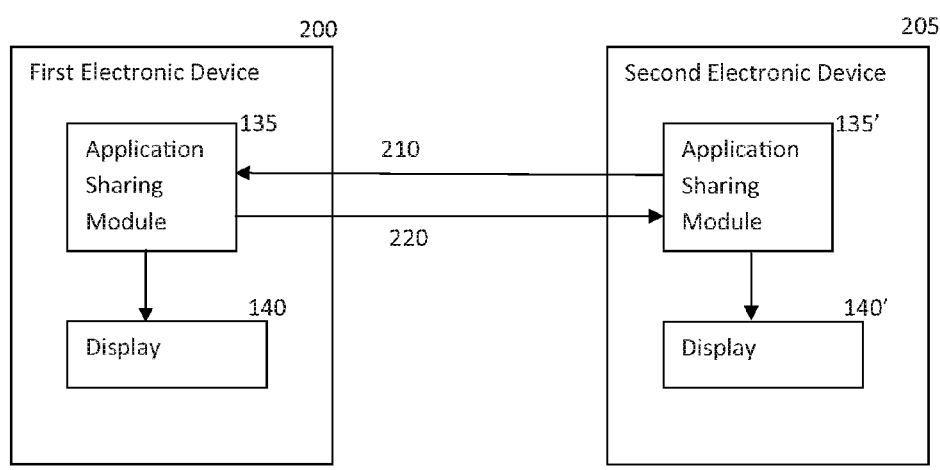
FIG. 2 is a sample diagram showing a first example of interactive application sharing between a first and second electronic device.

As previously mentioned, the electronic device 100 of FIG. 1 may interactively share applications with another electronic device. A basic implementation of interactive sharing is shown in FIG. 2 and set forth in the flowchart of FIG. 3. As shown in FIG. 2, a first electronic device 200 may communicate with a second electronic device 205. The first and second electronic devices 200, 205 may be the same as, or similar to, the electronic device 100 discussed with respect to FIG. 1. Likewise, each electronic device 200, 205 may have all or some of the internal components discussed with respect to FIG. 1, although none are shown in FIG. 2 for purposes of clarity.

III. Interactive Application Sharing

Figure 3:
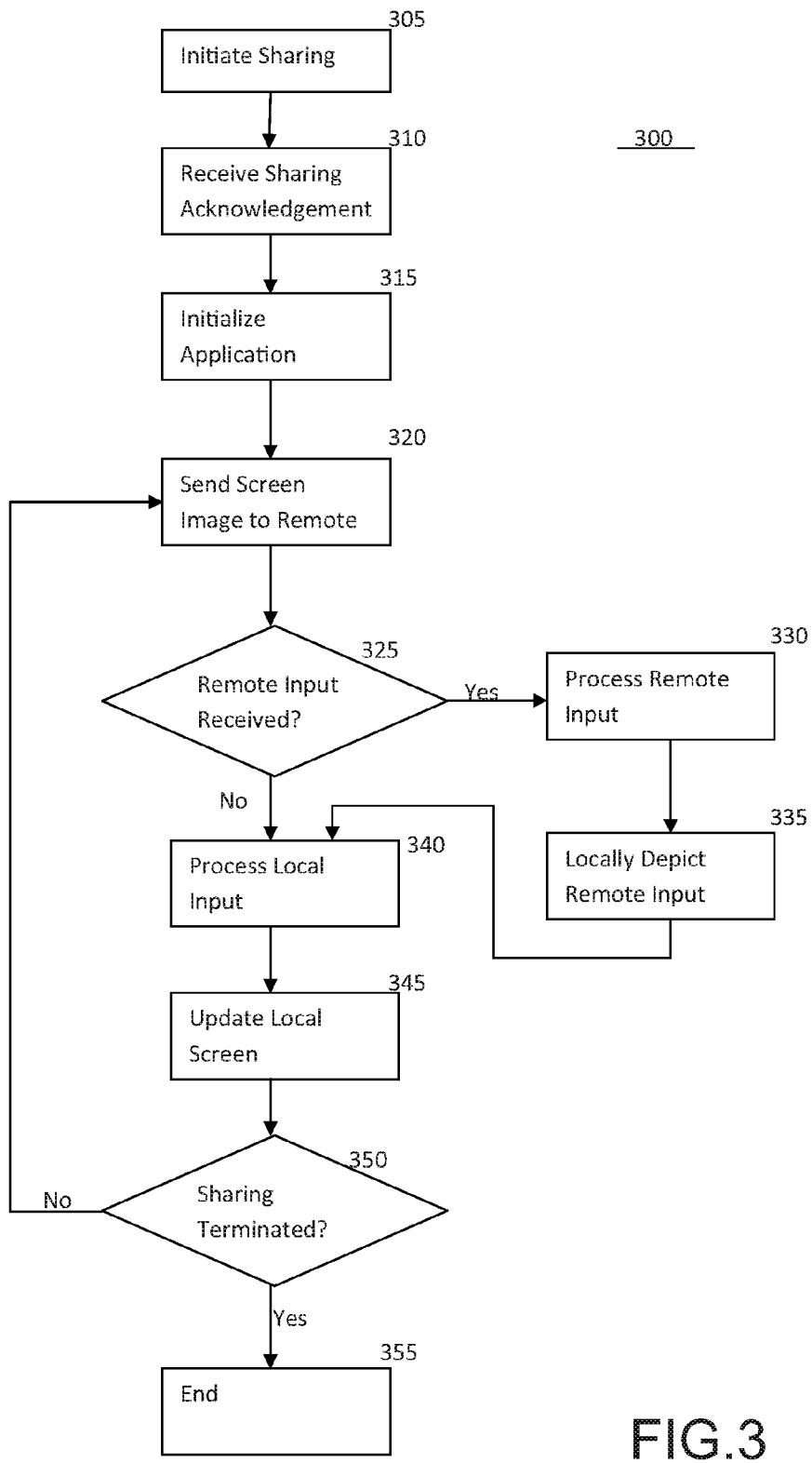
FIG. 3 is a flowchart depicting a sample method for interactive application sharing, in accordance with the example of FIG. 2.

FIGS. 2 and 3 presume that the first electronic device 200 initiates application sharing and the discussion of these figures is prepared with this in mind. Turning now to FIG. 2, a general overview of interactive application sharing will now be provided. As the initiator, the first electronic device 200 hosts the application sharing session and provides screen image updates to the second electronic device 205. The first electronic device 200 may transmit a request to share an application to the second electronic device 205. The request may be transmitted from the first device's transmitter to the second device's receiver, as one example.

In some embodiments, the option to interactively share an application may be provided to a user by the electronic devices 200, 205 only when some other communication is already occurring between the devices. Thus, as one example, the devices may require an audio or video communication, such as a phone call or FACETIME video conference, to be established between the devices before any applications may be shared. Requiring such communication may ensure that sufficient bandwidth exists to permit interactive application sharing, as the bandwidth necessary to engage in a video conference is generally sufficient to transfer data at the rate necessary to share applications. This may also facilitate audio and/or video interaction between users during application sharing activities. It should be appreciated that certain applications may be restricted from sharing data. For example, a device administrator and/or manufacturer may prevent certain applications from being shared. This restriction may be on an application-by-application basis, or may apply to any application that includes particular functionality or accesses specific hardware and/or data.

As a brief example, interactive application sharing may be performed during a video conference, such as FACETIME, which operates at least on certain portable communications devices designed and/or sold by Apple Inc. FACETIME generally incorporates several open standard technologies to initiate a video conference, encode and transmit video and audio data, and control the communication session. FACETIME audio and video may be encoded in accordance with the AAC and H.264 codecs, respectively, while session initiation protocols (e.g., SIP) may be used as the signaling protocol for the voice over IP communication. Likewise, the real-time transport protocol (e.g., RTP) and/or secure real-time transport protocol (e.g., SRTP) may be employed to deliver real-time media streams between electronic devices. Generally, interactive application sharing may be performed in this context. As one example, data used during application sharing may be packetized, encoded and transmitted along with, or as part of, the videoconferencing data.

The first electronic device 200 may transmit a request to initiate interactive application sharing to the second electronic device 205. More particularly, the application sharing module 130 of the first device may transmit this request to the application sharing module 130' of the second device. Depending on the particular embodiment, this request may occur during a remote conference. Regardless, the user of the first electronic device may select a particular application for both the first and second devices 200, 205 to share. If the user of the second device accepts the request to share, the particular application may be initiated on the second device. The acceptance of the application sharing request is transmitted from the second device's application sharing module 130' to the first device's application sharing module 130.

A user interface menu may be provided to allow a user to configure interactive application sharing. For example, the user interface may permit a user to identify certain applications that may be shared and certain applications that may be prevented from sharing. As a further example, the user interface may permit the user to designate which applications may by partially shared and/or the types of data that may be shared in an application. The user interface may permit a user to designate a certain list of people, devices and/or contacts for each application, or a group of applications, and enable certain sharing characteristics or permissions for that group only. For example, particular contacts may be specified for different privacy settings (or privacy designators, as discussed below) and identified through the user interface by name, telephone number, device identifier and the like. The user interface may include a plurality of menu options (buttons, sliders, lists, and the like) that permit a user to access and control the aforesaid functionality. As functionality is chosen, the processor 135 may vary the application sharing permissions, such as privacy designators, to match the user's selections. These permissions may be stored in the storage of the device 100 and accessed during any application sharing session.

Typically, although not necessarily, when interactive application sharing is initiated and accepted during a video conference, one of the application and video are overlaid on the other. The application may be overlaid on the video or the video may be overlaid on the application. In either case, the overlaid visual element may be resized to occupy less than an entirety of the display so that both video and application are at least partially visible.

In the event the second electronic device 205 also has access to a local copy of the shared application, it may execute a copy of the shared application locally. In such an event, either data 220 used by the second device to construct a screen image of the application, as seen by the first user, may be transmitted or the screen image 220 itself may be transmitted and interpreted by the application or application sharing module 130' operating on the second electronic device 205. If the second electronic device does not have access to a local copy of the shared application, a screen image 220 of the application may be generated by the first electronic device 200 and transmitted to the second electronic device 205 for display, thereby emulating the operation of the application.

The second electronic device 205 provides remote input data 210 to the first electronic device 200. The first device processes the remote input data 210, along with any local input data received by the first device through (for example) its user input 115, on an application sharing module 130. Essentially, the application sharing module 130 coordinates the remote input data 210 and input data locally received by the first electronic device 200 and provides both sets of data to the application being shared. The coordination provided by the application sharing module 130 may take a variety of forms. In an alternative embodiment, remote input data and local input data may be combined by a remote server in electronic communication with both devices, and transmitted to each device across one or more communication links. This server may facilitate video communication associated with the interactive application sharing, as well, although this is not necessary.

As one non-limiting example, remote input data 210 and locally-received input data may be processed by the application sharing module 130 sequentially. Essentially, the application sharing module 130 may include the shared application; both sets of input data may be processed by the shared application which, in turn, may output a view 225 of the application on the first electronic device's display. This same view may be transmitted from the first electronic device 200 to the second electronic device 205, which in turn may also show the view on its display.

As another option, the application sharing module 130 may process both sets of inputs (remote and local) in such a fashion that two unique views are generated. Input data may be depicted on the displays 140, 140' of each device 200, 205 differently, depending on where that input data originated. For example, input data originating from a particular device may be processed and outputted with no special depiction, while remote input data may be specially shown on a device's display screen 140. Consider, for example, a touch-based user input 115. Touches, gestures and the like may not be displayed on the screen of the electronic device 200, 205 on which they originate, as the user of that device presumably has provided the input. By contrast, touches and other remote input data that originates from a remote device may be shown on a display of a local device; this may signify to a viewer/user of the local device 200 that user of the remote device 205 is providing a specific type of input.

Thus, the application sharing module 130 may process both sets of inputs and output two different screen views in accordance with the application being shared. The user of the first electronic device 200 may see dots, spots, or other highlights indicating where on a touch-based display a user of the second electronic device 205 is interacting with the shared application. Likewise, highlights may appear on the displayed application, as shown on the second electronic device 205, indicating where the user of the first device 200 is touching his or her touch-based display with respect to the shared application. This permits each user of an interactively shared application to visually perceive the inputs provided by other users, but not necessarily their own. In such an embodiment, it should be appreciated that the view provided by the first electronic device 200 and the second electronic device 205 may be different, in that different inputs may be depicted. Accordingly, the application sharing module 130 may process and configure two screen images that differ only with respect to the inputs being shown; the first image is shown locally on the display of the first device and the second image is transmitted across a network to the second device, where it is displayed.

The application sharing module may transmit full screen images from the first electronic device 200 to the second electronic device 205, in which case the module computes both images. Alternately, the application sharing module 130 may transmit only data necessary for a similar module resident on the second device 205 to create the screen image. In this case, the full screen image may not be transmitted but instead only the data necessary for the application sharing module of the second electronic device may be sent.

FIG. 3 is a flowchart discussing particular operations that may be performed during interactive application sharing between two electronic devices 200, 205, as schematically shown in FIG. 2. The method 300 begins in operation 305, in which a first electronic device 200 initiates a request to interactively share an application. Next, in operation 310, the first electronic device 200 receives an acknowledgement from the second electronic device 205 that sharing is permitted.

Following operation 310, in operation 315 the first electronic device initializes the application to be shared. In some embodiments, the application may be initialized prior to the request to share that is sent in operation 300. In other embodiments, initializing an application on an electronic device 200 may automatically prompt the device to initiate a request to share. This may be done, for example, when a device is placed in an auto-share mode, in which all applications are automatically shared with another electronic device 205 to which the first device is otherwise connected.

In operation 320, the first electronic device 200 transmits a screen image 220 to the remote electronic device 205. The screen image 220 may be displayed by the remote device, so that both users are viewing identical, or nearly identical, images. The screen image may be transmitted with an instruction regarding how the image is to be displayed, or the screen image itself may be considered an instruction regarding display insofar as the remote device may interpret receipt of the screen image as an instruction to automatically display the image.

In operation 325, the first electronic device 200 determines if remote input relating to the shared application has been received from the remote electronic device 205. This operation may be performed by the processor 135 or application sharing module 130 of the first device, for example.

If the electronic device 200 determines that no remote input has been received in operation 325, then operation 340 is executed as described below. Otherwise, operation 330 is accessed.

In operation 330, the first electronic device 200 processes the remote input. This may entail executing certain functionality associated with the application, reserving part of the application for the exclusive use or control of the remote user via the second electronic device 205, updating the image generated by the application either locally or remotely, or both, and so on. Again, this operation may be executed by any suitable hardware, firmware or software element of the first electronic device, such as the processor 135 or application sharing module 130.

Following operation 330, the first device locally depicts the remote input in operation 335. The remote input may be locally depicted as a specialized cursor or graphical element in some embodiments, as discussed in more detail below with respect to FIG. 6.

Still with respect to FIG. 3, operation 340 is executed after operation 335. In operation 340, the first electronic device 200 processes any local input received from the local user. Next, in operation 345, the first electronic device updates its screen display to reflect the local input.

In operation 350, the first electronic device determines in the interactive sharing of the application has been terminated. If so, the method 300 proceeds to end state 355 and halts. Otherwise, operation 320 is again accessed and a screen image (and/or instruction) is sent to the remote, second electronic device 205 from the first electronic device 200. It should be appreciated that the screen image may be identical to that generated and locally depicted by the first electronic device or may be different. As one example, the screen image sent to the remote may not include specialized graphical elements indicating the second user's input, as is shown on the first electronic device 200. Instead, the screen image transmitted in operation 320 may include specialized graphical elements indicating the location of the first user's inputs.

It should be appreciated that the method 300 shown in the flowchart of FIG. 3 generally presumes that some form of screen image is transmitted from the first electronic device 200 to the second electronic device 205. Other embodiments may transmit, in operation 320, only image data that is used by the second device to update its screen.

IV. Interactive Application Sharing of Private Data

Figure 4:
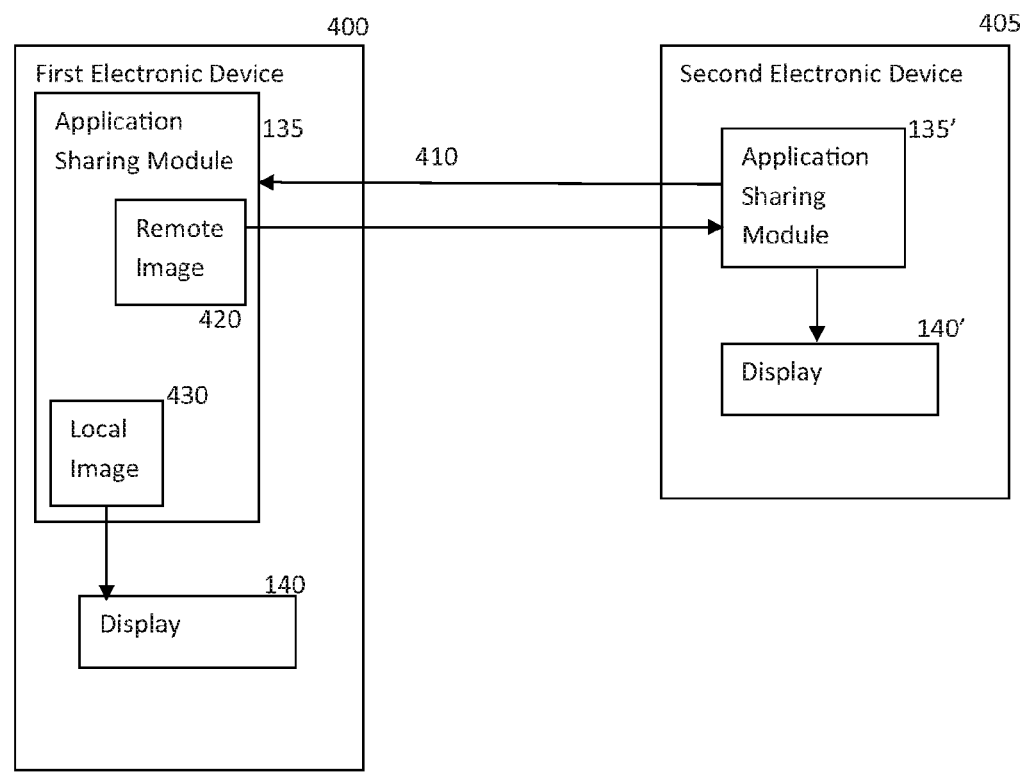
FIG. 4 is a sample diagram showing a second example of interactive application sharing between a first and second electronic device.
Figure 7A:
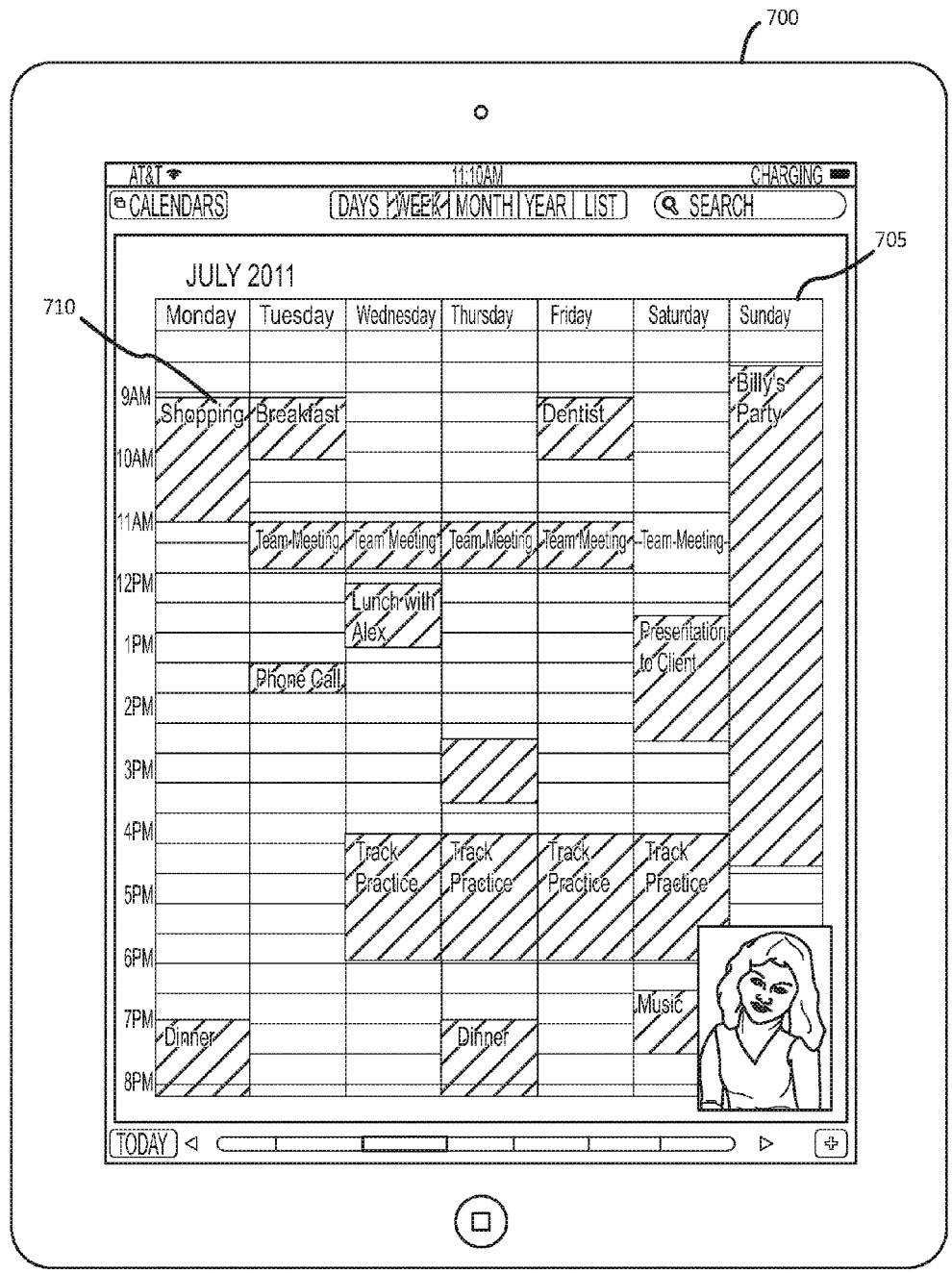
FIG. 7A depicts an electronic device accessing an application prior to interactive sharing and showing only local application data.
Figure 7B:
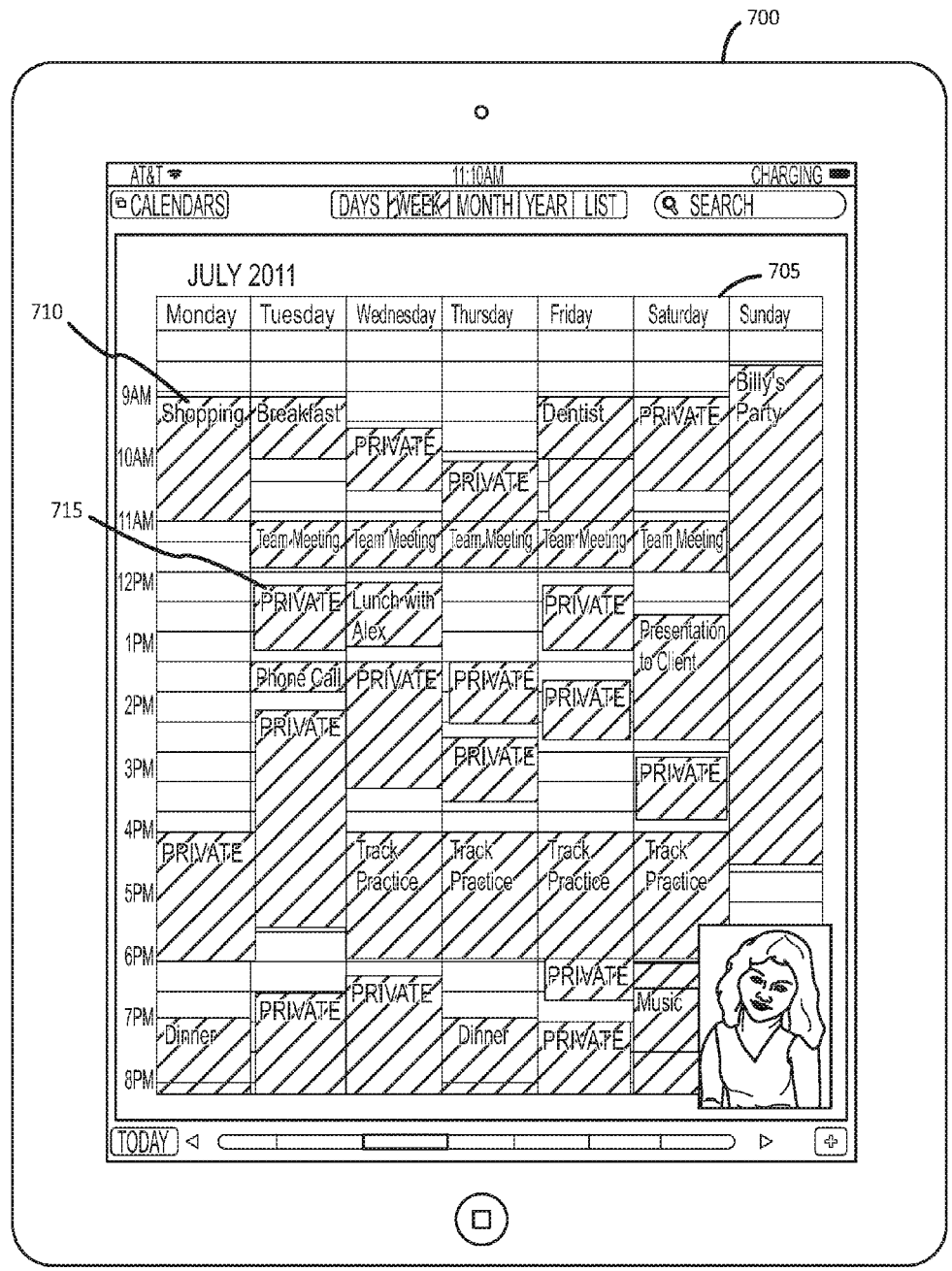
FIG. 7B depicts an electronic accessing the application shown in FIG. 7A after interactive sharing has been initiated with another device, and particularly showing both local and remote application data.

FIG. 4 is a schematic diagram of a second model for interactive application sharing between two electronic devices 400, 405. In this embodiment, users of the devices 400, 405 may designate certain application data as private and thus not shared, or shared only partially. When partially shared, certain information particular to the private data may not be shared. FIGS. 7A and 7B, discussed in more detail below, provide an example of partial sharing.

Still with respect to FIG. 4, remote application data 410 may again be provided by the second electronic device 405 to the first electronic device 400. This occurs generally in the fashion discussed previously with respect to FIGS. 2 and 3. Here, however, the remote application data 410 may include a flag or other indicator that instructs the first device 400 if the remote input data is private (a "privacy designator"). The application sharing module 130 of the first device 400 may receive the data and process it in accordance with the privacy designator.

If there is no privacy designator, or the designator indicates the remote application data 410 is not private, then the data is processed and displayed in substantially the same way as described previously with respect to FIGS. 2 and 3. It should be appreciated that a privacy designator may flag some application data as sharable and some as not sharable. For example, consider a single appointment on an electronic calendar. The start and end time of the appointment may be shared while the location and participants are not. Similarly, a contact may be flagged by a privacy designator to permit sharing of the contact's name and title, but not address or telephone number. As another example, the contact's work number may be shared, but not a home or mobile number. As still another example, a privacy designator associated with media content may permit sharing the presence of the media on an electronic device, but not the media itself, its nature, its play length, number of times viewed or played, and so on. Essentially, a privacy designator may be used to fully or partially control sharing of associated application data with any third party.

If the remote application data 410 includes a privacy designator, then the application sharing module 130 or processor 135, as appropriate, processes the input data in accordance with the application being shared between the first and second electronic devices 400, 405. The application sharing module or processor then may generate a local image 430 of the application and a remote image 420 of the application. The local image depicts the application with the remote application data 410 masked or partially obscured, as appropriate for the privacy designator and/or shared application. Conversely, the remote image 420 depicts the application with any private local information masked or partially obscured. The local image 430 is displayed on the first device's display 140. The remote image 420 is transmitted to the second device 405 to be shown on its display 140'.

As another option, the second electronic device may determine if application data 410 to be shared is marked private or not. If so, then the second electronic device may partially or fully redact the application/application data 410 prior to transmitting it to the first electronic device. In such an embodiment, a privacy designator may not be necessary. However, this embodiment offloads some processing of the application sharing methodology to the second electronic device 405.

Remote input data may also be processed by the first electronic device 400 in a manner similar to that discussed with respect to FIGS. 2 and 3, above.

Figure 5:
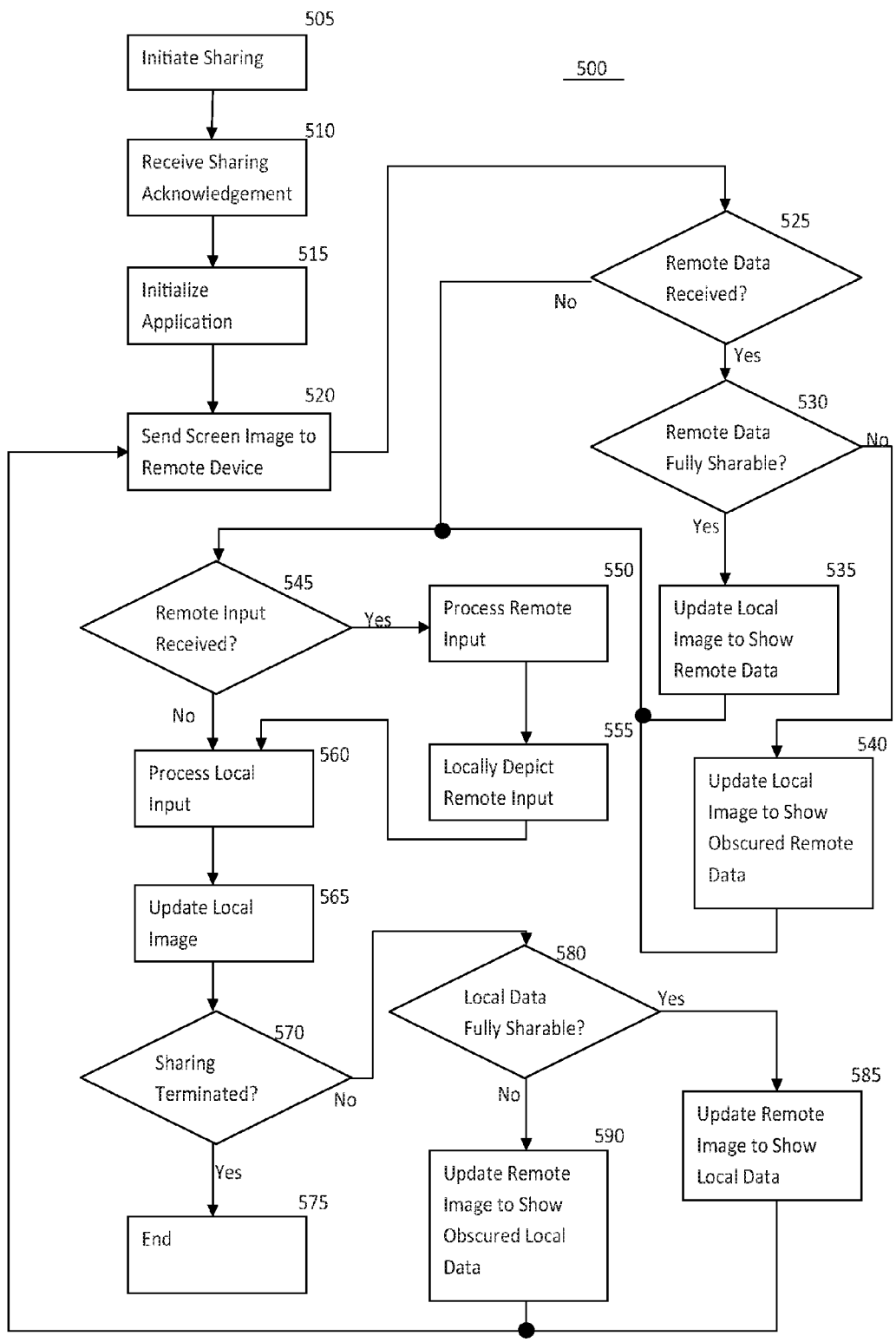
FIG. 5 is a flowchart depicting a sample method for interactive sharing, in accordance with the example of FIG. 4.

FIG. 5 is a flowchart generally depicting a sample method 500 for executing interactive application sharing with private data, in accordance with the system shown in FIG. 4. Operations 505-520 generally correlate to operations 305-320 of FIG. 3, and so are not discussed further herein. References in the discussion of FIG. 5 to the "embodiment" generally refer to the local electronic device 400 or one or more of its constituent elements, as appropriate.

After operation 520, operation 525 is executed. In this operation, the embodiment determines if remote application data 410 has been received from the second electronic device 405. If not, then operation 545 is executed as discussed further below. However, if remote data is received in operation 525, operation 530 is accessed.

The embodiment determines in operation 530 if the remote data is fully sharable (e.g., if the data includes a privacy designator and, if so, the nature of the designator). If the remote data is fully sharable, then the local image 430 is updated with the remote application data 410; after this, operation 545 is executed.

If the remote application data 410 is not fully sharable, then in operation 540 the embodiment updates the local image to reflect the privacy restrictions on the data. The remote application data 410 may be shown in the local application image as partially or fully obscured, for example.

Following any of operations 525, 535 and 540, operation 545 is executed. In operation 545, the embodiment determines if remote user input has been received. If so, this remote user input is processed in operation 550 and then locally depicted in operation 555. Operation 550 generally corresponds to operation 330 of FIG. 3 while operation 555 generally corresponds to operation 335 of the same figure. Accordingly, these operations are not discussed in greater detail.

Following operation 555, or after operation 545 if no remote input was received by the first electronic device 400, operation 560 is accessed. In operation 560, local user input is processed. The embodiment then updates the local image 430 in operation 565 and determines in operation 570 if sharing has been terminated. Operations 560-570 generally correspond to operations 340-350 of FIG. 3. If sharing has been terminated, then the method 500 ceases in end state 575.

Presuming sharing is not terminated, the embodiment proceeds from operation 570 to operation 580. In operation 580, the embodiment examines any local application data to determine if it is fully sharable with the second electronic device 405. If so, then the remote image 420 is updated in operation 585 to show the local application data fully. An instruction regarding the sharing and/or display of the local application data may also be transmitted to the second electronic device; the instruction may, for example, contain one or more privacy designators. Otherwise, operation 590 is accessed.

In operation 590, the remote image 420 is updated with the local application data according to any privacy designators associated with the local application data. The privacy designators, as previously discussed, may control what application data is shown and the nature of its depiction. After operation 590, the remote image 420 is transmitted to the second electronic device 405 in operation 520.

V. User Interface

Various embodiments may include or incorporate specialized user interface elements to reflect user input and application data in an application sharing environment. For example, user inputs may be shared between electronic devices; remote user inputs may be graphically shown on a local device so that both users are aware of the others' inputs.

Figure 6:
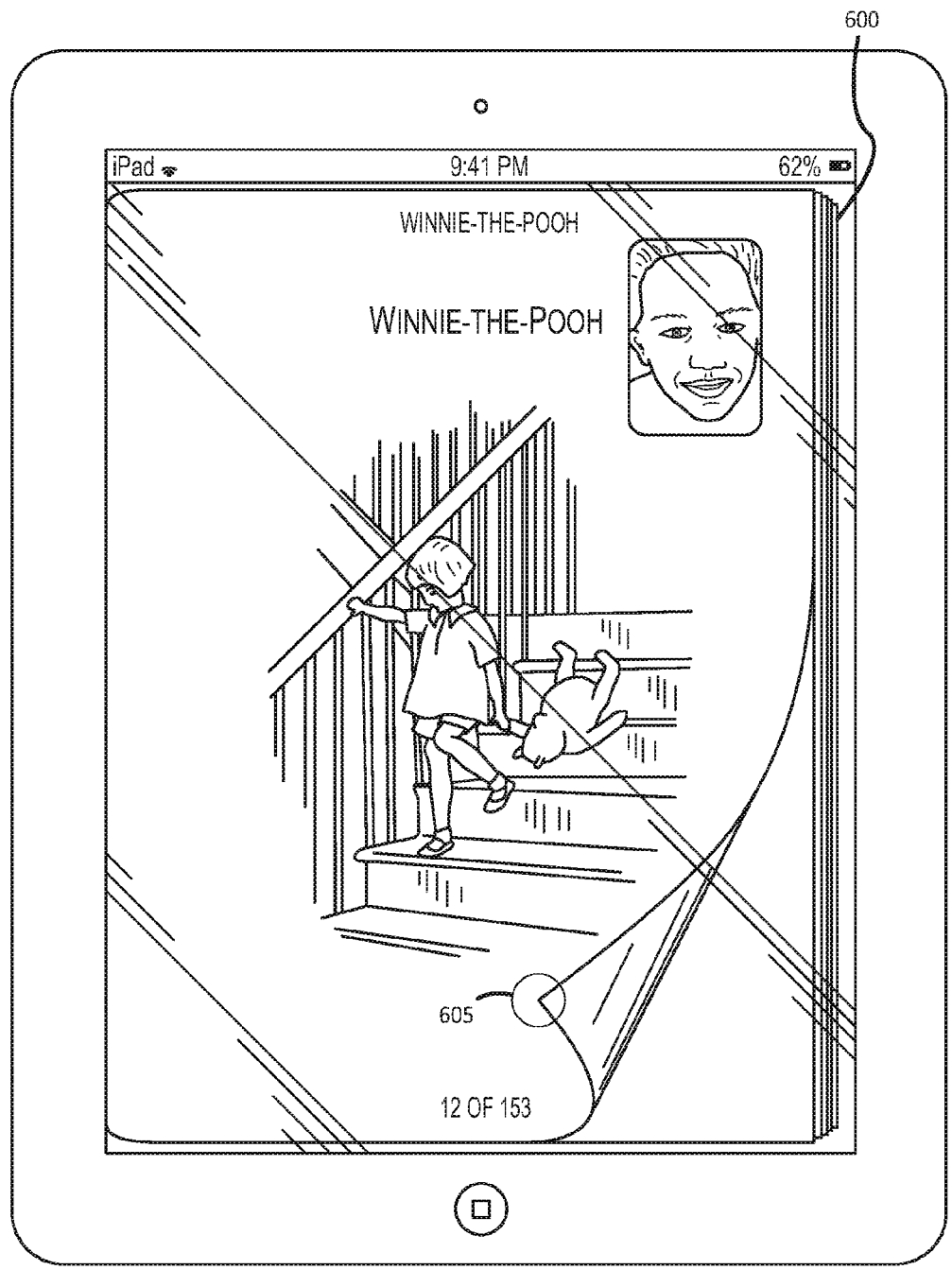
FIG. 6 is a first sample screen showing an example of interactive application sharing, specifically showing an example depiction of a remote user's input on a local user's display.

One example of a specialized graphical element representing a remote input is shown in FIG. 6. In FIG. 6, the dashed circle 605 shown in the application 600 represents a remote user touching, selecting or otherwise interacting with the shared application, through the second electronic device 205, at the point marked by the circle. Because the local user cannot see the remote user's touch or other input mechanism, the first electronic device 200 creates and displays the circle to provide visual feedback to the first user of the second user's interaction. It should be understood that other graphical representations may be used to depict the remote user points of input.

The specialized graphical elements may indicate not only a remote user's points of input, but also which portions or functions of an application are remotely controlled and thus unavailable or "locked out" to a local user of an electronic device 100. It may be useful to permit only a single user to interact with certain aspects, portions, features and/or segments of an application, thereby preventing conflicting inputs from multiple users or struggles between two instances of a shared application fighting for control.

Priority for controlling applications, or portion of applications, may be handled in a variety of ways. In one embodiment, the first person to touch or otherwise interact with a given portion of the application may control that portion, until control is relinquished. As an example, the first person to active an application function through a touch-based input may maintain control of the function until the touch is terminated. In some embodiments, the first person's gestural input (such as a multi-touch gesture) may be overridden by a second person's gesture or other input on his or her device.

Alternately, the initiator of the interactive application sharing session may always control any functionality or portion of the shared application. As still another option, the host of an application sharing session may exercise such control. As yet another option, the last user to touch an application may control that application.

As previously mentioned, certain application data may be only partially shared; some application data may be kept private and not visible by the other user. One example of this is shown in FIGS. 7A and 7B. In the example of these figures, certain appointments on an electronic calendar application 705 resident on a second electronic device (not shown) may be designated as private. If calendar data is shared between the first and second devices, the times at which the private appointments occur may be shown as blocked out on the view provided by the interactive application being shared (or the application sharing module 130) on the first electronic device 700. Further, the user interface may show the times of such private appointments as grayed out, but not provide the particulars of the appointments. Thus, the first user may see, on his calendar application 700, that the second user is unavailable at certain times but may not see the location of private appointments, with whom they occur, and the like. As one example, FIG. 7A depicts a sample electronic device 700 executing a calendar application 705, showing a local user's appointments 710; FIG. 7B depicts the same electronic device 700 engaging in interactive sharing of the calendar application 705, with a second user's appointments 715 partially shared.

Figure 8:
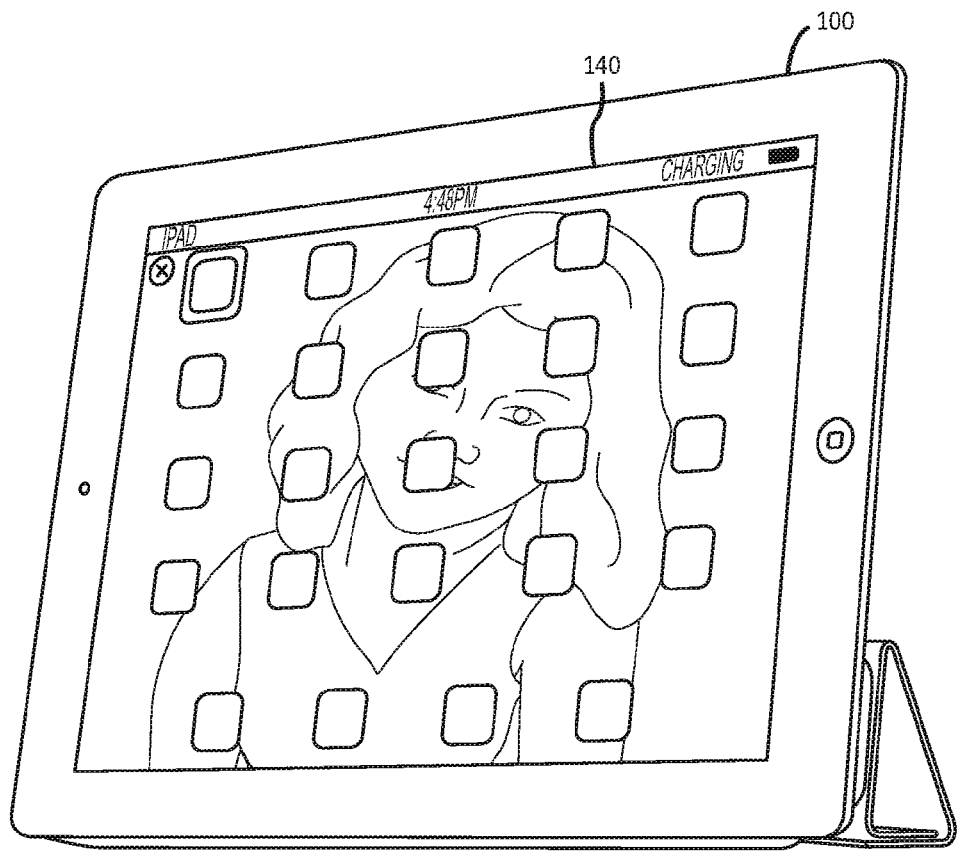
FIG. 8 is another sample screen showing another example of interactive application sharing, particularly depicting a visual combination of a video communication and an application arrangement.

FIG. 8 depicts one sample view of an electronic device's 100 display 140, showing one interface for interactive application sharing. After interactive application sharing is initiated between two devices, and during a video conference, a list or matrix of all applications may be superimposed over the video conference image. A user may select one of the applications from the list to share with the remote electronic device. When the application is selected, it may expand to fill the entirety of the display 140 while the video conference image is reduced in size and overlaid on the application. FIGS. 6 and 7b generally depict this relationship between video conference image and application. The transition from a list of applications overlaying a video image to a video image overlaying a single application may vary with embodiment.

Typically, although not necessarily, an embodiment may force an interactively shared application into a full-screen display mode on the first and second electronic device 200, 205. Given the relatively small display 140 real estate on many portable devices, maintaining the application in a full-screen mode may enhance viewability and sharing functionality. In some embodiments, the application being shared may occupy the entire screen or a majority of the screen, and no video may be overlaid on the application. During application sharing, either or both of video and audio may be suspended or terminated, depending on the embodiment and/or the application being shared.

Further, certain embodiments may address rotation of one or both electronic devices 200, 205 during interactive application sharing and that rotation's impact on display of an application. It may be desirable for both users to have the same view of an application during application sharing in order to create a common experience for the users and provide common reference. However, many portable electronic devices will adjust, resize, or otherwise alter the display of an application when the device is rotated or otherwise physically moved. Some applications may even provide different functionality, depending on the orientation of the electronic device 100.

To synchronize the users' experiences and views of an application, an embodiment may override the adjustment of an application in response to device rotation or motion. In some embodiments, applications may include a default view that is maintained regardless of device motion. In other embodiments, the application may be locked to the view that was provided when application sharing was initiated or the application was launched. In still other embodiments, one user may have control over the application view, so that when that user's electronic device 200 is rotated, the view changes and the new view is forced onto other users' electronic devices 205. Typically, although not necessarily, the user initiating application sharing may maintain this control.

It may be useful to provide a certain visual transition to interactive application sharing from a video conference, as shown on the display 140. In some embodiments, the shared application may appear to slide onto the display of the second device from a side of the display. In other embodiments, the application may expand, pop up, grow, fade in, or otherwise appear on the device display. Essentially, any transition that adds the application to the display is contemplated.

VI. Application Data Storage

Certain embodiments may permit interactive application sharing not only with application data provided by electronic devices to one another, but also with application data owned by a particular user of an electronic device and stored in remote, network-accessible storage. In some embodiments, the application data may be stored in or on a server forming part of a non-centralized repository, colloquially referred to as "the cloud."

Cloud-stored application data may be retrieved by an electronic device 200 at the direction of another electronic device 205. Essentially, instead of directly transmitting application data from the second electronic device 205 to the first electronic device 200, the second electronic device may transmit instructions to the first device regarding the location of the data and how to retrieve it. In this manner, the first electronic device 200 may access application data beyond that locally stored in the second device.

Further, some embodiments may store cloud copies of all application data and/or input data transmitted between devices 200, 205 during an interactive application sharing session. This data may be time stamped in some embodiments. Later, a user may access these cloud copies to recreate the interactive application sharing session. This may be useful, for example, to refresh a user's memory or review interactions and/or application behavior that may have otherwise been missed during the sharing session itself.

VII. Concluding Remarks

Although embodiments have been discussed herein with respect to certain apparatuses, systems and method, it should be appreciated that any of the foregoing may vary in alternative embodiments. For example, certain operations may be omitted from the methods shown in FIGS. 3 and 5, or the order of operations may be changed, or additional operations executed. Likewise, the electronic device 100 shown in FIG. 1 may include more elements than are shown. Further, although embodiments have been discussed in the context of two electronic devices interactively sharing an application, three or more devices may likewise share. Accordingly, the proper scope of protection is set forth in the following claims.

We claim:

1. A method for interactively sharing an application, comprising:
   initiating, by a first electronic device, a communication session with a second electronic device;
   after initiating and during the communication session, transmitting a request from the first electronic device to engage in sharing an application with the second electronic device;
   receiving, at the first electronic device, confirmation of sharing from the second electronic device during the communication session;
   displaying, on the first electronic device, the application and data related to the communication session:
   generating, at the first electronic device, an instruction to the second electronic device, the instruction related to displaying the application on the second electronic device; and
   transmitting the instruction to the second electronic device during the communication session.

2. The method of claim 1, wherein the instruction is a screen image for display on the second electronic device.

3. The method of claim 1, wherein:
   the communication session is a video conference; and
   the data related to the communication session is an image of the video conference.

4. The method of claim 3, wherein the operation of displaying, on the first electronic device, the application and data related to the communication session comprises overlaying the image of the video conference on the application.

5. The method of claim 4, wherein the application occupies an entirety of a display screen associated with the first electronic device, other than a portion of the display screen occupied by the image of the video conference.

6. The method of claim 1, further comprising:
   receiving, at the first electronic device, a remote user input from the second electronic device;
   processing the remote user input;
   updating a status of the application in response to processing the remote user input; and
   displaying the updated status of the application on the first electronic device.

7. The method of claim 6, further comprising:
   determining a location of the remote user input relative to a display screen of the first electronic device; and
   displaying, on the display screen of the first electronic device, a specialized graphical element at the location of the remote user input.

8. The method of claim 6, further comprising:
   determining a functionality of the application accessed by the remote user input; and
   locking out the functionality at the first electronic device such that the functionality cannot be accessed from the first electronic device.

9. The method of claim 8, further comprising:
   receiving an indication that the remote user input has terminated; and
   in response to termination of the remote user input, providing access to the functionality from the first electronic device.

10. The method of claim 1, further comprising:
    in response to initiating the communication session between the first electronic device and the second electronic device, generating a video signal overlaying a list of applications on an image representing the communication session; and
    displaying the video signal on a display of the first electronic device.

11. The method of claim 10, further comprising:
    in response to receiving confirmation of sharing from the second electronic device, generating a second video signal overlaying the image representing the communication session on the application; and
    transitioning from displaying the video signal to displaying the second video signal on the display of the first electronic device.

12. A method for interactively sharing application data, comprising:
    initiating a communication between a first electronic device and a second electronic device;
    after initiating and during the communication, transmitting a request, from the first electronic device to the second electronic device, to engage in sharing an application;
    receiving, at the first electronic device, confirmation of sharing from the second electronic device during the communication;
    receiving, at the first electronic device, application data from the second electronic device during the communication;
    processing the application data;
    determining, from a privacy designator, if the application data may be fully shared;
    in the event the application data may not be fully shared, displaying the application data in the application during the communication in accordance with the privacy designator; and
    otherwise, displaying the application data in the application during the communication.

13. The method of claim 12, wherein the operation of displaying the application data in the application in accordance with the privacy designator comprises displaying obscured application data.

14. The method of claim 12, wherein the operation of display the application data in the application in accordance with the privacy designator comprises displaying part, but not all, of the application data.

15. The method of claim 12, further comprising:
    initiating a communication between the first electronic device and a server; and
    retrieving an application related to the application data from the server.

16. The method of claim 12, further comprising:
initiating a first communication link between the first electronic device and a server;
transmitting first application data from the first electronic device to the server across the first communication link;
wherein the operation of receiving, at the first electronic device, application data from the second electronic device comprises:
receiving, from the server, the application data relayed from the first electronic device.

17. The method of claim 16, wherein the application data is a portion of a combined data set also including the first application data, the combined data set generated by the server.

18. The method of claim 12, wherein the privacy designator varies according to at least one of an identifier of the second electronic device and a user of the second electronic device.

19. The method of claim 12, further comprising re-orienting the application data on the first electronic device to match an orientation of the application data on the second electronic device.

20. An apparatus for interactively sharing an application, comprising:
a processor;
a memory storing an application and in communication with the processor;
a transmitter operative to receive remote user input data across a network from a remote device, the transmitter in communication with the processor;
an application processing module in communication with the processor and operative to generate a screen image of the application based, at least in part, on the remote user input data;
an imaging device operative to generate an image of a user of the apparatus; and
a receiver in communication with the processor and operative to transmit the screen image and the image of a user to the remote device during a video conference.

21. A method for combining interactive application data, comprising:
receiving, at a server, first interactive application data from a first device transmitted during an application sharing session;
receiving, at the server, second interactive application data from a second device transmitted during the application sharing session;
combining, at the server, the first and second interactive application data to form combined application data;
transmitting the combined application data to the first and second devices during the application sharing session; and
transmitting an instruction regarding display of the combined application data to the first and second devices during the application sharing session.

22. The method of claim 21, wherein the instruction relates to an orientation of the combined application data.

* * * * *

UNITED STATES PATENT AND TRADEMARK OFFICE
CERTIFICATE OF CORRECTION

| | | |
|---|---|---|
| PATENT NO. | : 8,965,349 B2 | Page 1 of 1 |
| APPLICATION NO. | : 13/359185 | |
| DATED | : February 24, 2015 | |
| INVENTOR(S) | : Kieft et al. | |

It is certified that error appears in the above-identified patent and that said Letters Patent is hereby corrected as shown below:

In the Claims

In column 13, line 36, in Claim 1, delete "session:" and insert --session;--, therefor Signed and Sealed this
Seventh Day of July, 2015

Michelle K. Lee
*Director of the United States Patent and Trademark Office*